United States Patent
Lee et al.

(10) Patent No.: US 9,804,434 B2
(45) Date of Patent: Oct. 31, 2017

(54) LIQUID CRYSTAL DISPLAY HAVING SHAPED COLOR FILTERS

(71) Applicant: SAMSUNG DISPLAY CO., LTD., Yongin, Gyeonggi-Do (KR)

(72) Inventors: Sun Hwa Lee, Yongin-si (KR); Sang-Uk Lim, Yongin-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/935,058

(22) Filed: Nov. 6, 2015

(65) Prior Publication Data
US 2016/0223859 A1 Aug. 4, 2016

(30) Foreign Application Priority Data
Feb. 2, 2015 (KR) .................. 10-2015-0016281

(51) Int. Cl.
*G02F 1/1335* (2006.01)
*G02F 1/1362* (2006.01)

(52) U.S. Cl.
CPC .................. *G02F 1/133514* (2013.01); *G02F 2001/136222* (2013.01)

(58) Field of Classification Search
CPC ...................... G02F 1/133514; G02F 1/133516
See application file for complete search history.

(56) References Cited

U.S. PATENT DOCUMENTS

| 2004/0263748 | A1* | 12/2004 | Park | G02F 1/134363 349/141 |
| 2005/0117092 | A1* | 6/2005 | Park | G02F 1/133514 349/106 |
| 2006/0087603 | A1* | 4/2006 | Lee | G02B 5/201 349/109 |
| 2010/0253889 | A1* | 10/2010 | Sugawara | G02B 5/201 349/106 |

FOREIGN PATENT DOCUMENTS

| JP | 2004-280111 A | 10/2004 |
| KR | 10-2006-0134260 A | 12/2006 |
| KR | 10-2007-0071293 A | 7/2007 |
| KR | 10-2008-0062822 A | 7/2008 |
| KR | 10-2013-0027915 A | 3/2013 |

* cited by examiner

*Primary Examiner* — Phu Vu
(74) *Attorney, Agent, or Firm* — Innovation Counsel LLP

(57) ABSTRACT

An exemplary embodiment of the present invention provides a liquid crystal display, including: a first substrate; a second substrate facing the first substrate; a liquid crystal layer formed between the first substrate and the second substrate; and a first color pixel area, a second color pixel area, and a third color pixel area formed on the first substrate or the second substrate, wherein the first, second, and third color pixel areas respectively include one of a red filter, a green filter, and a blue filter, and a cross-section of the blue filter has an at least approximately parabolic or semicircular shape. According to exemplary embodiments of the present invention, it is possible to prevent excessively yellow images and improve luminance thereof by changing a shape of a blue color filter included in the liquid crystal display.

8 Claims, 9 Drawing Sheets

LIQUID CRYSTAL DISPLAY HAVING SHAPED COLOR FILTERS

CROSS-REFERENCE TO RELATED APPLICATION

This application claims priority to, and the benefit of, Korean Patent Application No. 10-2015-0016281 filed in the Korean Intellectual Property Office on Feb. 2, 2015, the entire contents of which are incorporated herein by reference.

BACKGROUND (a) Field

Embodiments of the present invention relate to liquid crystal displays. More specifically, embodiments of the present invention relate to liquid crystal displays having shaped color filters.

(b) Description of the Related Art

As one of the most widely used flat panel displays at present, a liquid crystal display (LCD) includes two display panels on which field generating electrodes such as a pixel electrode and a common electrode are formed, and a liquid crystal layer interposed between the two display panels. The LCD displays an image by generating an electric field in a liquid crystal layer, by applying a voltage to the field generating electrodes. This electric field induces certain alignment directions of liquid crystal molecules of the liquid crystal layer, thus controlling polarization of incident light.

Since the liquid crystal display is not self-emissive, a light source is required. The light source may be a separately provided artificial light source or a natural light source. Artificial light sources commonly used in the liquid crystal display include light emitting diodes (LEDs), cold cathode fluorescent lamps (CCFLs), and external electrode fluorescent lamps (EEFLs). The artificial light source is disposed at a rear surface or a lateral surface of the liquid crystal display, to emit light. Herein, the light source may be a white light source for emitting white light.

In general, a color filter is employed for the liquid crystal display to facilitate display of red, green, and blue. Recently, a liquid crystal display further including white pixels in addition to red, green, and blue pixels, has been developed to increase the luminance of the display.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a liquid crystal display that may prevent excessively yellowish images and improve luminance thereof by changing a shape of a blue color filter included in the liquid crystal display.

An exemplary embodiment of the present invention provides a liquid crystal display, including: a first substrate; a second substrate facing the first substrate; a liquid crystal layer formed between the first substrate and the second substrate; and a first color pixel area, a second color pixel area, and a third color pixel area formed on the first substrate or the second substrate. The first, second, and third color pixel areas respectively include one of a red filter, a green filter, and a blue filter, and a cross-section of the blue filter has an at least approximately parabolic or semicircular shape.

The first substrate may further include a fourth color pixel area and a white filter formed in the fourth color pixel area.

A cross-section of the red filter, the green filter, or the white filter has an at least approximately rectangular shape.

Light blocking members around between the red filter, the green filter, the blue filter, and the white filter may be further included.

An overcoat formed to cover the red filter, the green filter, the blue filter, the white filter, and the light blocking member may be further included.

Pixel electrodes respectively disposed in the first color pixel area, the second color pixel area, the third color pixel area, and the fourth color pixel area may be further included.

A light source disposed proximate to a rear surface of the first or second substrate may be further included.

The blue filter may be positioned so that light emitted from the light source passes through the blue filter, and may be directed to the pixel area adjacent to the blue filter.

Another exemplary embodiment of the present invention provides a liquid crystal display, including: a first substrate; a second substrate facing the first substrate; a liquid crystal layer formed between the first substrate and the second substrate; and a first color pixel area, a second color pixel area, and a third color pixel area formed on the first substrate or the second substrate. The first, second, and third color pixel areas respectively include one of a red filter, a green filter, and a blue filter, and a cross-section of the blue filter has an at least approximately trapezoidal or saw-toothed shape.

According to an embodiment of the present invention, it is possible to prevent undesirably yellowish images and improve luminance thereof by changing a shape of a blue color filter included in the liquid crystal display.

DETAILED DESCRIPTION OF THE EMBODIMENTS

Figure 1:
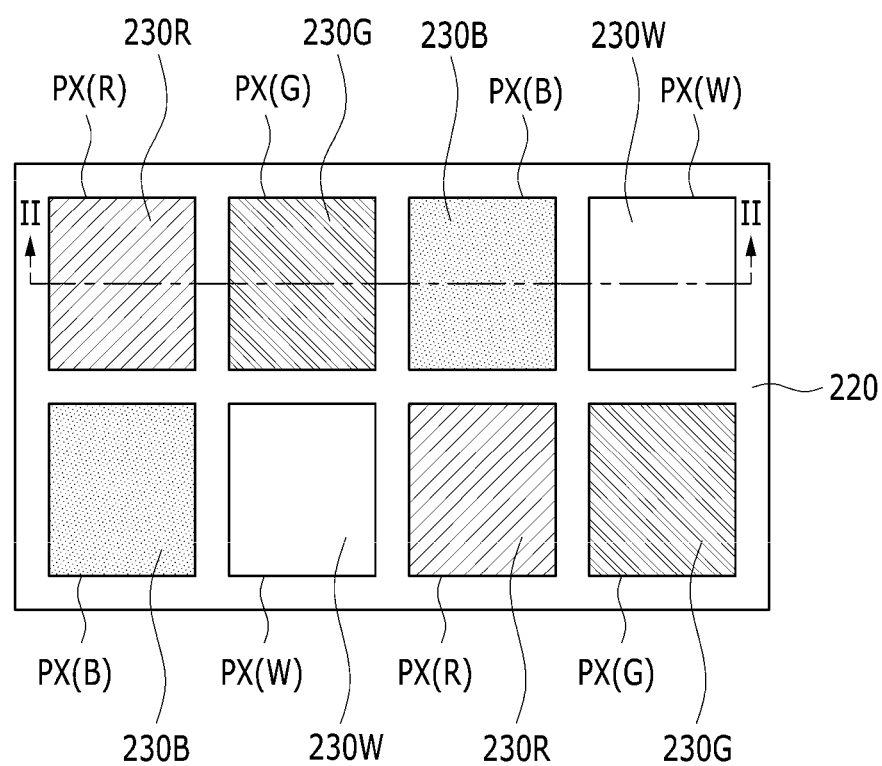
FIG. 1 is a plan view of a liquid crystal display according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

In the drawings, the thickness of layers, films, panels, regions, etc., are exaggerated for clarity. The various Figures are thus not to scale. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

All numerical values are approximate, and may vary. All examples of specific materials and compositions are to be taken as nonlimiting and exemplary only. Other suitable materials and compositions may be used instead.

First, a liquid crystal display according to an exemplary embodiment of the present invention will now be described in detail with reference to FIGS. 1 and 2.

Figure 2:
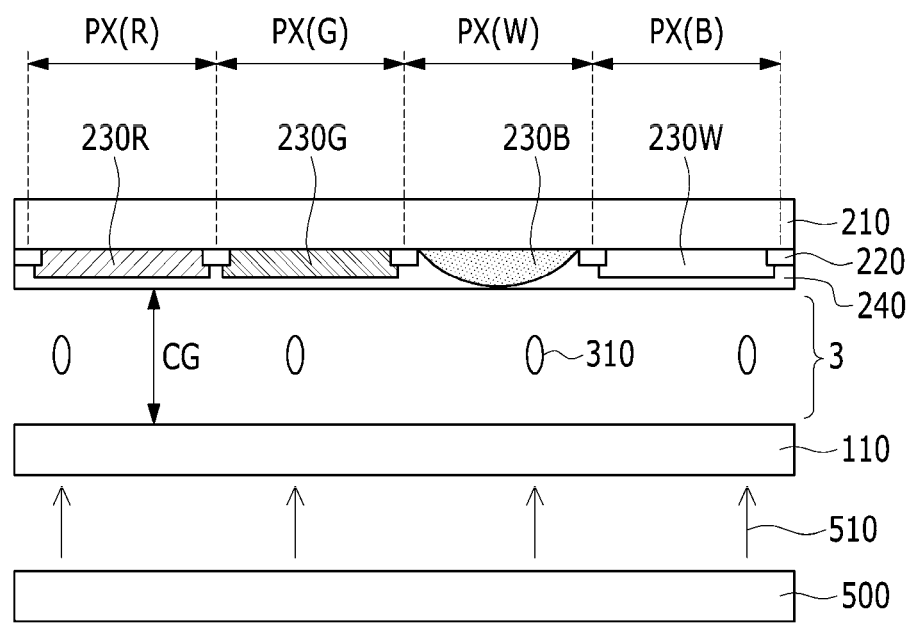
FIG. 2 is a cross-sectional view of FIG. 1 taken along line II-II.

FIG. 1 is a top plan view of a liquid crystal display according to an exemplary embodiment of the present invention, and FIG. 2 is a cross-sectional view of FIG. 1 taken along line II-II.

A liquid crystal display according to an exemplary embodiment of the present invention includes a first substrate 110 and a second substrate 210 disposed to face each other, and a liquid crystal layer 3 disposed between the first substrate 110 and the second substrate 210.

The first substrate 110 and the second substrate 210 may be made of glass, plastic, or the like. The liquid crystal layer 3 may include a plurality of liquid crystal molecules 310, and may be formed as a positive type or a negative type liquid crystal layer.

A light source 500 may be disposed at or near a rear surface of the first substrate 110 to face the substrate 110. The light source 500 may include one or more light emitting diodes (LEDs) to emit light 510. An orientation of the liquid crystal molecules 310 of the liquid crystal layer 3 is determined by an electric filed generated between the first substrate 110 and the second substrate 210, and an amount of light that passes through the liquid crystal layer 3 is varied depending on the orientation of the liquid crystal molecules 310. A plurality of color filters 230R, 230G, 230B, and 230W are disposed on the second substrate 210. When the light passing through the liquid crystal layer 3 is incident to the color filters 230R, 230G, 230B, and 230W, some light passes therethrough and other light is absorbed therein.

For convenience, the light source 500 is illustrated to be disposed at the rear surface of the first substrate 110, but the light source 500 may be disposed at any other suitable location, such as a rear surface of the second substrate 210.

The liquid crystal display may include a plurality of pixel areas, and the pixel areas may be divided into a first color pixel area PX(R), a second color pixel area PX(G), a third color pixel area PX(B), and a fourth color pixel area PX(W). The first color pixel area PX(R), the second color pixel area PX(G), and the third color pixel area PX(B) respectively serve to display different colors such as primary colors, and their colors may be combined into a white color. The fourth color pixel area PX(W) may display a white color. For example, the first color pixel area PX(R), the second color pixel area PX(G), the third color pixel area PX(B), and the fourth color pixel area PX(W) may respectively display red, green, blue, and white colors.

However, the present invention is not limited thereto. For example, despite their letter designations, the first color pixel area PX(R), the second color pixel area PX(G), the third color pixel area PX(B), and the fourth color pixel area PX(W) may respectively display cyan, magenta, yellow, and white colors. Any other colors are also contemplated.

The color filters 230R, 230G, 230B, and 230W are disposed in respective pixel areas on the second substrate 210. Specifically, the red filter 230R, the green filter 230G, and the blue filter 230B are respectively disposed in the first color pixel area PX(R), the second color pixel area PX(G), and the third color pixel area PX(B). The red filter 230R may exclusively permit red frequencies of the white light to pass therethrough. The green filter 230G may exclusively permit green frequencies of the white light to pass therethrough. The blue filter 230B may exclusively permit blue frequencies of the white light to pass therethrough.

The white filter 230W may be disposed in the fourth color pixel area PX(W), which is transparent and does not impart a color to light passing therethrough. The white filter 230W may thus be formed of a photoresist that may permit all wavelength bands of the visual rays to pass therethrough, but it is not limited thereto.

In other words, the white filter 230W is a filter in which the frequency spectrum of light passing therethrough is not substantially changed and the color of the transmitted light may be basically maintained, but is not limited thereto, and the white filter 230W may be a filter in which wavelength of light may be changed in a predetermined range according to a characteristic of the white filter 230W.

Each of the pixel areas PX(R), PX(G), PX(B), and PX(W) may have a rectangular shape with two short sides and two long sides. In the first color pixel area PX(R), the second color pixel area PX(G), the third color pixel area PX(B), and the fourth color pixel area PX(W), the red filter 230R, the green filter 230G, the blue filter 230B, and the white filter 230W may be respectively formed to have a generally quadrangular flat shape conforming or similar to the shape of the pixel areas PX(R), PX(G), PX(B), and PX(W).

In addition, a cross-section of the blue filter 230B according to the exemplary embodiment of the present invention may have a parabolic or semicircular shape.

Conventionally, much of the light of the blue wavelengths laterally emitted by the blue filter 230B is lost. Thus, in conventional displays, luminance of the blue wavelengths is measured to be substantially lower than those of the other wavelengths.

In addition, due to light loss of the blue wavelength, light of the red and green wavelengths that have relatively higher luminance than light of the blue wavelength at the lateral surface impart a yellowish appearance to images viewed from the lateral surface.

Accordingly, when a cross-section of the blue filter 230B is formed to have a parabolic or semicircular shape such that the blue filter 230B may alter angles of the light 510 emitted from the light source 500, light loss of the blue wavelength laterally emitted from the light source 500 may be reduced. That is, the configuration of the present embodiment may increase the amount of laterally emitted blue light, thus reducing or preventing the above described disadvantages of conventional displays.

This will be described more fully with reference to FIGS. 3A and 3B.

The red, green, white filters 230R, 230G, and 230W, but not the blue filter 230B, may be formed to have a rectangular cross-section.

Light blocking members 220 may be further disposed at respective boundaries between the first color pixel area PX(R), the second color pixel area PX(G), the third color pixel area PX(B), and fourth color pixel area PX(W). The light blocking members 220 may prevent color mixture, light leakage, and the like that may occur at the boundaries between the pixel areas PX(R), PX(G), PX(B), and PX(W).

An overcoat 240 may be further disposed on the red filter 230R, the green filter 230G, the blue filter 230B, the white filter 230W, and the light-blocking member 220. The overcoat 240 may serve to smooth a top surface of the second substrate 210.

The white filter 230W may be formed from the same material as the overcoat 240, by the same process.

Next, a method of increasing lateral luminance of the blue filter 230B according to the exemplary embodiment of the present invention will be described more fully with reference to FIGS. 3A and 3B. FIGS. 3A and 3B are cross-sectional views illustrating directions of light transmitting through the color filter according to the exemplary embodiment of the present invention.

Figure 3A:
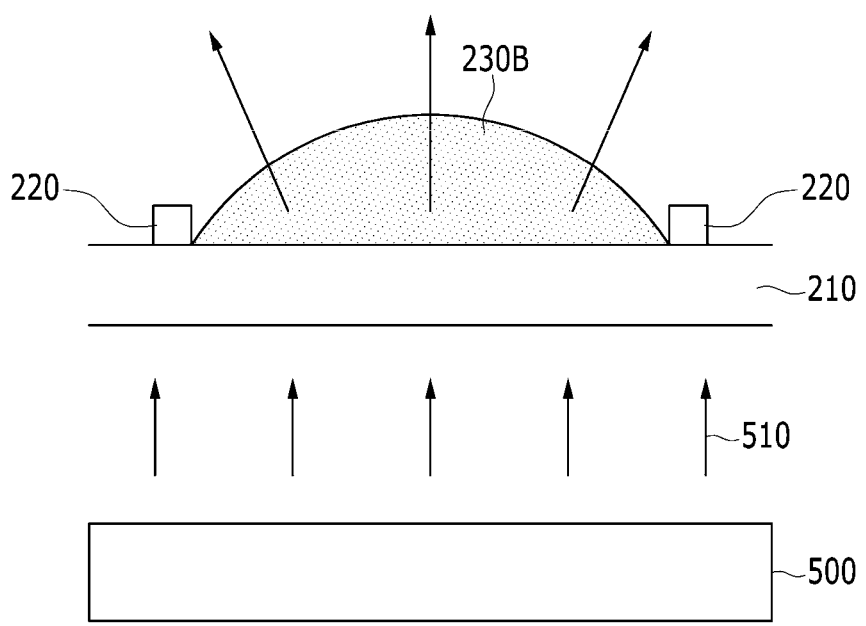
FIGS. 3A and 3B are cross-sectional views illustrating directions of light transmitted through a color filter according to an exemplary embodiment of the present invention.

In FIG. 3A, the light source 500 is disposed at or proximate to a rear surface of the second substrate 210. In FIG. 3B, the light source 500 is disposed at or proximate to a front surface of the second substrate 210.

Figure 3B:
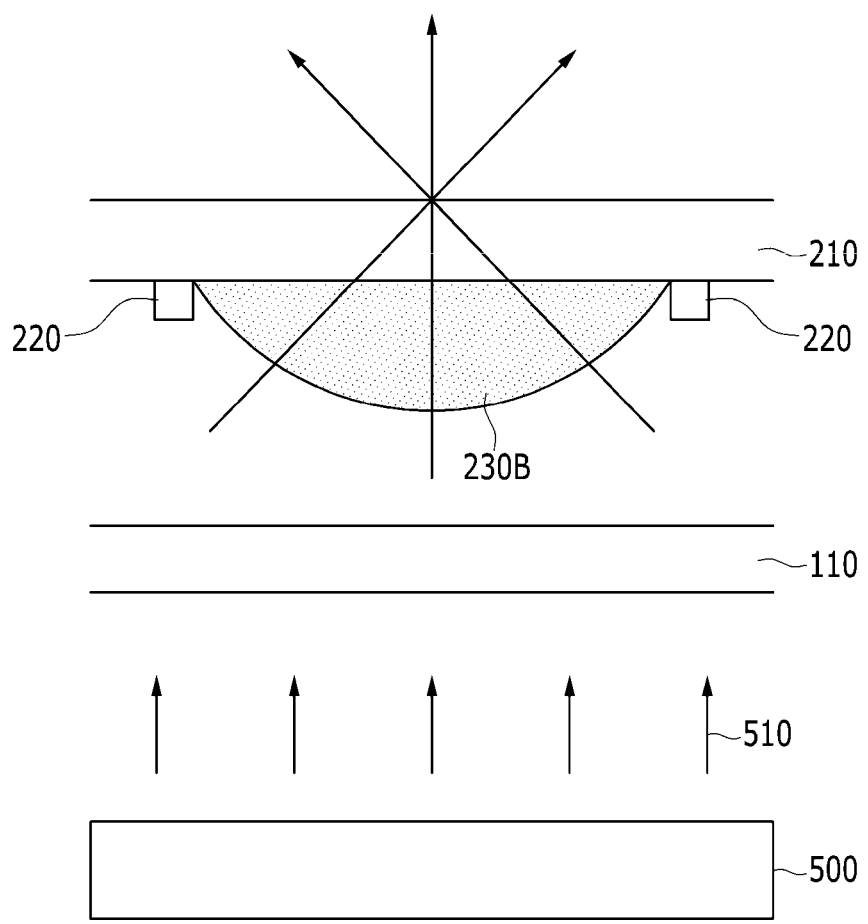

Referring to FIGS. 3A and 3B, when the light 510 emitted from the light source 500 enters a surface of the parabolic or semicircular blue filter 230B, an exiting angle thereof gradually increases from a center portion of the parabolic or semicircular blue filter 230B toward is edge. That is, the parabolic or semicircular shape of filter 230B spreads out incident light, so more blue light is directed laterally.

As such, by the increase of the exiting angle of the light 510, the light 510 transmitting through a lateral portion of the blue filter 230B is refracted laterally. In other words, the light 510 is refracted and dispersed to a pixel area adjacent to the blue filter 230B. Therefore, the lateral luminance of blue wavelengths of light may be increased, and thus the above described yellowing problem may be improved.

A liquid crystal display according to an exemplary embodiment of the present invention will now be described more fully with reference to FIGS. 4 and 5.

Figure 4:
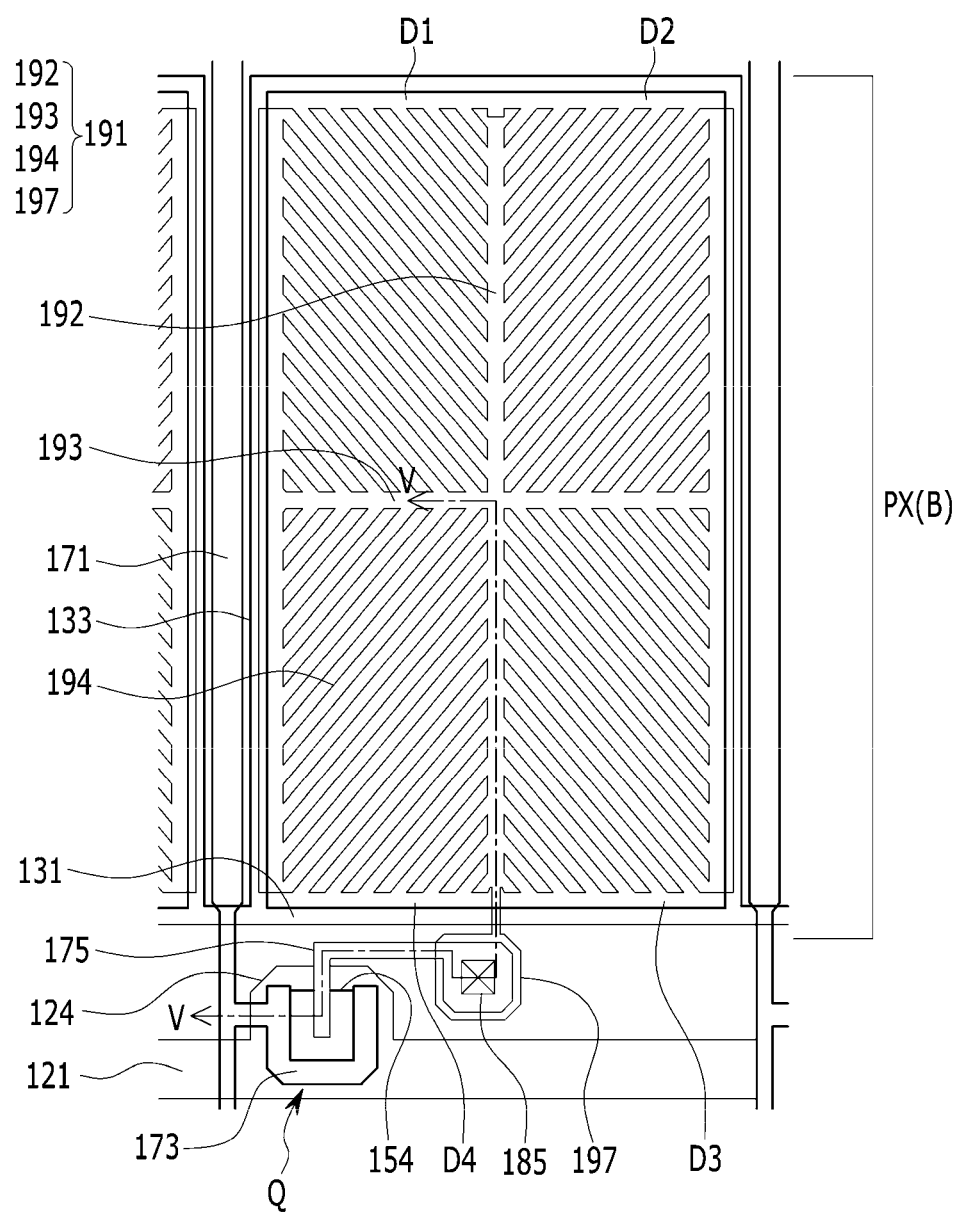
FIG. 4 is a plan view illustrating one pixel area of a liquid crystal display according to an exemplary embodiment of the present invention.
Figure 5:
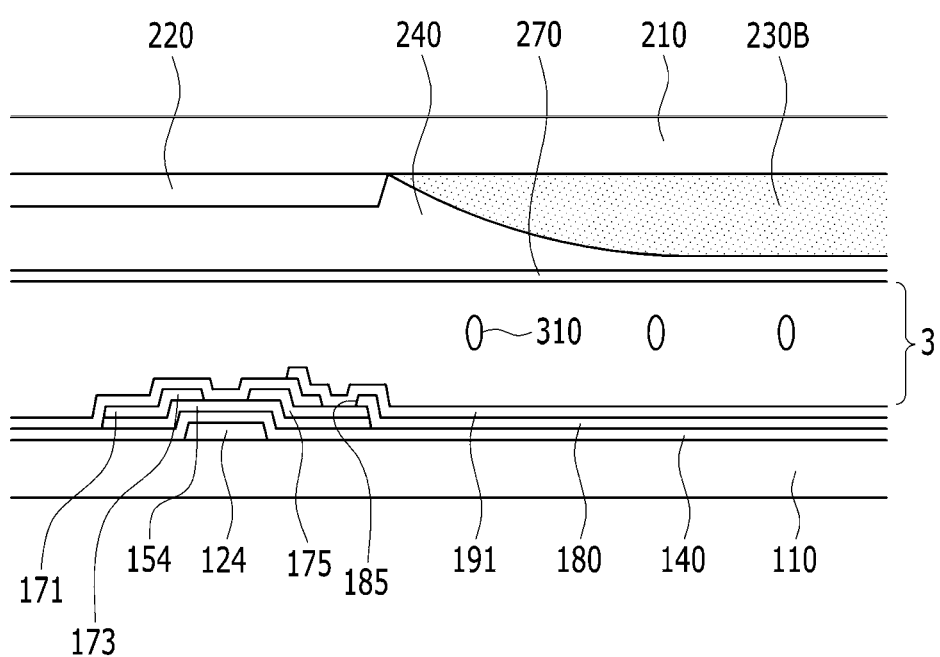
FIG. 5 is a cross-sectional view of FIG. 4 taken along line V-V.

FIG. 4 is a top plan view illustrating one pixel area of the liquid crystal display according to the exemplary embodiment of the present invention, and FIG. 5 is a cross-sectional view of FIG. 4 taken along line V-V.

As shown in FIGS. 4 and 5, a gate line 121 and a storage electrode line 131 are formed on a first substrate 110.

The gate line 121 substantially extends in a horizontal direction to transmit a gate signal. A gate electrode 124 is formed to protrude from the gate line 121.

The storage electrode line 131 extends generally in a direction parallel to the gate line 121, that is, in a horizontal direction, to transmit a predetermined voltage such as a common voltage. A storage electrode 133 is formed to extend from the storage electrode line 131. The storage electrode 133 may be formed to surround edges of the fourth color pixel area PX(W).

A gate insulating layer 140 is formed on the gate line 121, the gate electrode 124, the storage electrode line 131, and the storage electrode 133. The gate insulating layer 140 may be made of an inorganic insulating material such as a silicon nitride (SiNx) and/or a silicon oxide (SiOx). Further, the gate insulating layer 140 may be formed of a single layer or multiple layers.

A semiconductor 154 is formed on the gate insulating layer 140. The semiconductor 154 overlaps the gate electrode 124. The semiconductor 154 may be made of amorphous silicon, polycrystalline silicon, a metal oxide, and the like.

An ohmic contact member (not shown) may be further formed on the semiconductor 154. The ohmic contact may be made of a silicide or a material such as n+ hydrogenated amorphous silicon in which an n-type impurity is highly doped. In some embodiments, the ohmic contact member may be omitted.

A data line 171, a source electrode 173, and a drain electrode 175 are formed on the semiconductor 154. The source electrode 173 protrudes from the data line 171, and the drain electrode 175 is separated or spaced apart from the source electrode 173. The source electrode 173 and the drain electrode 175 overlap the gate electrode 124.

The gate electrode 124, the source electrode 173, and the drain electrode 175, together with the semiconductor 154, collectively form a thin film transistor Q. A channel of the thin film transistor Q is formed between the source electrode 173 and the drain electrode 175.

A passivation layer 180 is formed on the data line 171, the source electrode 173, the drain electrode 175, and an exposed portion of semiconductor 154, and a pixel electrode 191 is formed on the passivation layer 180. The pixel electrode 191 may be made of a transparent metal oxide such as indium tin oxide (ITO) or indium zinc oxide (IZO).

A general shape of the pixel electrode 191 is substantially a quadrangle. The pixel electrode 191 includes a cross-shaped stem including a horizontal stem portion 193, and a vertical stem portion 192 crossing the horizontal stem portion 193. Further, the pixel electrode 191 includes micro-branch portions 194 that extend from the horizontal stem portion 193 and the vertical stem portion 192. An extension 197 is further formed to extend from the quadrangular pixel electrode 191. The extension 197 is physically and electrically connected to the drain electrode 175 through a contact hole 185 to receive a data voltage from the drain electrode 175.

The contact hole 185 is formed through the passivation layer 180, and the pixel electrode 191 is connected to the drain electrode 175 through the contact hole 185.

The third color pixel area PX(B) is divided into four domains D1, D2, D3, and D4 by the horizontal stem portion 193 and the vertical stem portion 192 of the pixel electrode 191. The micro-branch portions 194 obliquely extend from the horizontal stem portion 193 and the vertical stem portion 192. For example, in the first domain D1, the micro-branch portion 194 extends from the horizontal stem portion 193 or the vertical stem portion 192 upward and leftward. In the second domain D2, the micro-branch portion 194 extends from the horizontal stem portion 193 or the vertical stem portion 192 upward and rightward. In the third domain D3, the micro-branch portion 194 extends from the horizontal stem portion 193 or the vertical stem portion 192 downward and rightward. In the fourth domain D4, the micro-branch portion 194 extends from the horizontal stem portion 193 or the vertical stem portion 192 downward and leftward.

Each micro-branch portion 194 may form an angle of about 45 or 135 degrees with respect to the gate line 121 or the horizontal stem portion 193. The directions of extension of the micro-branch portions 194 of two adjacent domains (D1, D2) and (D3, D4) may be perpendicular to each other.

The pixel electrode 191 may further include an outer stem that surrounds an outer circumference of the fourth color pixel area PX(W).

The blue filter 230B is formed on the second substrate 210 that is disposed to face the first substrate 110.

A cross-section of the blue filter 230B according to the exemplary embodiment of the present invention may have an at least generally parabolic or semicircular shape. It should be noted that embodiments of the invention encompass other shapes as well. In particular, any convex shape may be included.

As above, when a cross-section of the blue filter 230B is formed to have a parabolic or semicircular shape such that the blue filter 230B may change an angle of the light 510 emitted from the light source 500, light loss of blue wavelengths laterally emitted from the display may be reduced.

The light blocking member 220 is formed at the edge portion of the fourth color pixel area PX(W) (i.e., around or surrounding its outer edges), and the overcoat 240 is formed on the blue filter 230B and the light blocking member 220.

A common electrode 270 is formed on the overcoat 240. The common electrode 270 may be made of a transparent metal oxide such as indium tin oxide (ITO) or indium zinc oxide (IZO).

A predetermined voltage such as a common voltage is applied to the common electrode 270. When a data voltage is applied to the pixel electrode 191, an electric field is generated between the pixel electrode 191 and the common electrode 270, and the liquid crystal molecules 310 of the liquid crystal layer 3 disposed therebetween are induced to be arranged in a predetermined direction.

The above description was primarily of the third color pixel area PX(B), but the first, second, and fourth pixel areas PX(R), PX(G), and PX(W) may have a similar structure. However, unlike the third color pixel area PX(B), the red filter 230R is mostly formed in the first pixel area PX(R), the green filter 230G is mostly formed in the second pixel area PX(G), the white filter 230W is mostly formed in the fourth pixel area PX(W), and the filters 230R, 230G, and 230W respectively have rectangular shapes.

Herein, the filters 230R, 230G, 230B, and 230W have been described as being disposed on the second substrate 210, but the present invention is not limited thereto. In particular, the filters 230R, 230G, 230B, and 230W may alternatively be disposed on the first substrate 110. Hereinafter, this will be described with reference to FIG. 6.

Figure 6:
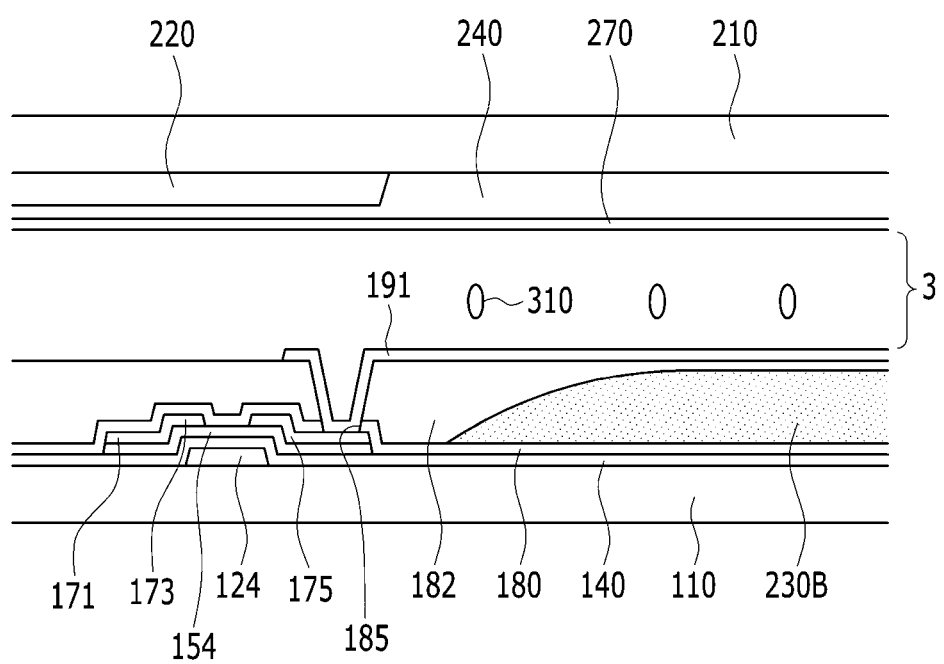
FIG. 6 is a cross-sectional view of a liquid crystal display according to an exemplary embodiment of the present invention.

FIG. 6 is a cross-sectional view of the liquid crystal display according to the exemplary embodiment of the present invention. FIG. 6 illustrates an exemplary third color pixel area PX(B).

First, compared with the liquid crystal display of the exemplary embodiment shown in FIG. 5, since the liquid crystal display of the exemplary embodiment shown in FIG. 6 is substantially the same as that of the exemplary embodiment shown in FIG. 5 except for the filters 230R, 230G, 230B, and 230W being disposed on the first substrate 110, any redundant description thereof will be omitted.

As shown in FIG. 6, a gate electrode 124, a semiconductor 154, a source electrode 173, a drain electrode 175, and a passivation layer 180 are formed on a first substrate 110, and a blue filter 230B is disposed on the passivation layer 180.

A cross-section of the blue filter 230B shown in FIG. 6 may have a generally parabolic or semicircular shape, such as that of the blue filter described above.

An overcoat 182 is formed on the passivation layer 180 and the blue filter 230B, and a pixel electrode 191 is formed on the overcoat 182.

A contact hole 185 is formed in the passivation layer 180 and the overcoat 182, and the pixel electrode 191 is connected to the drain electrode 175 through the contact hole 185.

The light blocking member 220, the overcoat 240, and the common electrode 270 are formed on the second substrate 210.

Hereinafter, liquid crystal displays according to other exemplary embodiments of the present invention will be described in detail with reference to FIGS. 7 and 8.

Figure 7:
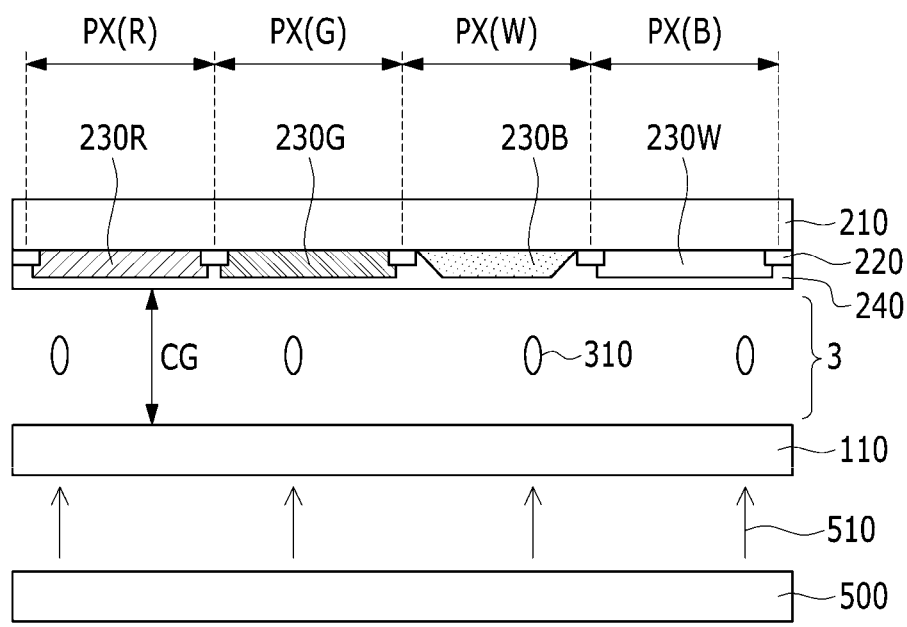
FIG. 7 is a cross-sectional view of a liquid crystal display according to another exemplary embodiment of the present invention.
Figure 8:
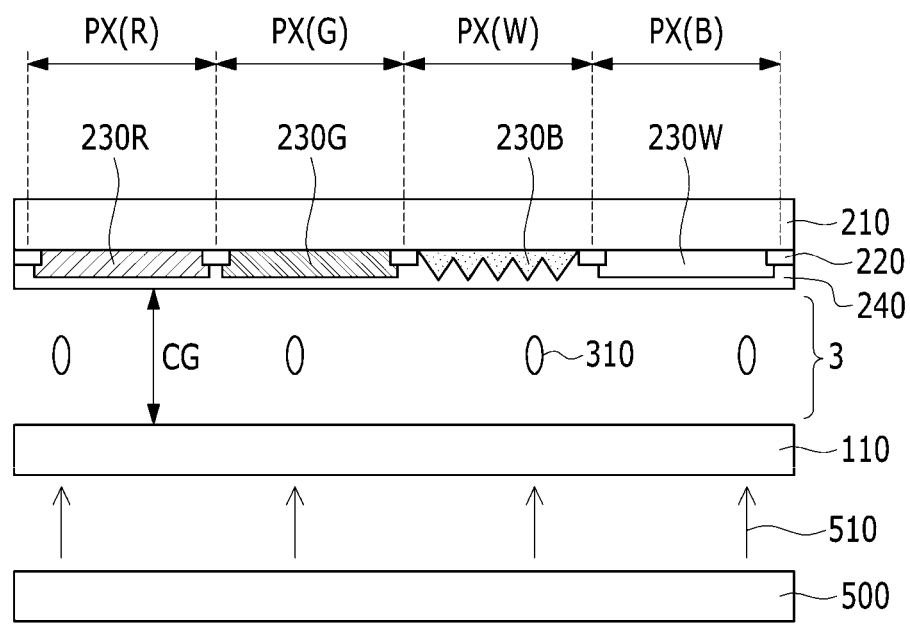
FIG. 8 is a cross-sectional view of a liquid crystal display according to a further exemplary embodiment of the present invention.

FIG. 7 is a cross-sectional view of a liquid crystal display according to another exemplary embodiment of the present invention, and FIG. 8 is a cross-sectional view of a liquid crystal display according to a further exemplary embodiment of the present invention.

Compared with the liquid crystal display of the exemplary embodiment shown in FIG. 2, since the liquid crystal displays of the exemplary embodiment shown in FIGS. 7 and 8 are substantially the same as that of the exemplary embodiment shown in FIG. 2 except for a shape of a blue filter 230B, any redundant description thereof will be omitted.

First, referring to FIG. 7, the blue filter 230B of a liquid crystal display of another exemplary embodiment of the present invention may be formed to have a substantially trapezoidal shape in cross-section.

When the light 510 emitted from the light source 500 passes through the trapezoidal blue filter 230B, the light 510 is emitted through both the top surface and the inclined side surfaces of blue filter 230B, thereby improving lateral luminance of blue wavelengths.

Next, referring to FIG. 8, a blue filter 230B of a liquid crystal display according to a further exemplary embodiment may be formed to have a saw-toothed shape in cross-section.

When the light 510 emitted from the light source 500 passes through the saw-toothed blue filter 230B, the light 510 is emitted through the angled side surfaces of the saw-toothed blue filter 230B, thereby improving lateral luminance of blue wavelengths.

As described above, according to the exemplary embodiment of the present invention, it is possible to prevent excessively yellowish images by changing the shape of the blue color filter included in the liquid crystal display.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Furthermore, different features of the various embodiments, disclosed or otherwise understood, can be mixed and matched in any manner to produce further embodiments within the scope of the invention.

DESCRIPTION OF SYMBOLS

| | |
|---|---|
| 3: liquid crystal layer | 110: first substrate |
| 121: gate line | 131: storage electrode line |
| 133: storage electrode | 171: data line |
| 191: pixel electrode | 191h: first subpixel electrode |
| 191l: second subpixel electrode | 198: slit |
| 210: second substrate | 220: light blocking member |
| 230R: red filter | 230G: green filter |
| 230B: blue filter | 270: common electrode |

What is claimed is:

1. A liquid crystal display, comprising:
a first substrate;
a second substrate facing the first substrate;

a liquid crystal layer formed between the first substrate and the second substrate; and a first color pixel area, a second color pixel area, and a third color pixel area formed on the first substrate or the second substrate, wherein the first, second, and third color pixel areas respectively include one of a red filter, a green filter, and a blue filter, and a cross-section of the blue filter has an at least approximately parabolic or semicircular shape, the shape extending from one end of the third color pixel area to an opposite end of the third color pixel area.

2. The liquid crystal display of claim 1 wherein the first substrate further includes a fourth color pixel area and a white filter formed in the fourth color pixel area.

3. The liquid crystal display of claim 2, wherein a cross-section of the red filter, the green filter, or the white filter has an at least approximately rectangular shape.

4. The liquid crystal display of claim 3, further comprising light blocking members formed around the red filter, the green filter, the blue filter, and the white filter.

5. The liquid crystal display of claim 4, further comprising an overcoat formed to cover the red filter, the green filter, the blue filter, the white filter, and the light blocking member.

6. The liquid crystal display of claim 5, further comprising pixel electrodes respectively disposed in the first color pixel area, the second color pixel area, the third color pixel area, and the fourth color pixel area.

7. The liquid crystal display of claim 1, further comprising a light source disposed proximate to a rear surface of the first or second substrate.

8. The liquid crystal display of claim 7, wherein the blue filter is positioned so that light emitted from the light source passes through the blue filter, and is directed to the pixel area adjacent to the blue filter.

* * * * *